July 28, 1931. E. WILDHABER 1,816,272
GEARING
Filed June 18, 1928  2 Sheets-Sheet 1

INVENTOR
Ernest Wildhaber

July 28, 1931.  E. WILDHABER  1,816,272
GEARING
Filed June 18, 1928    2 Sheets-Sheet 2
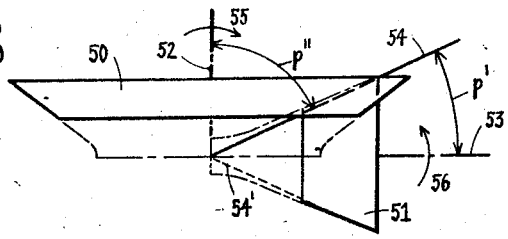
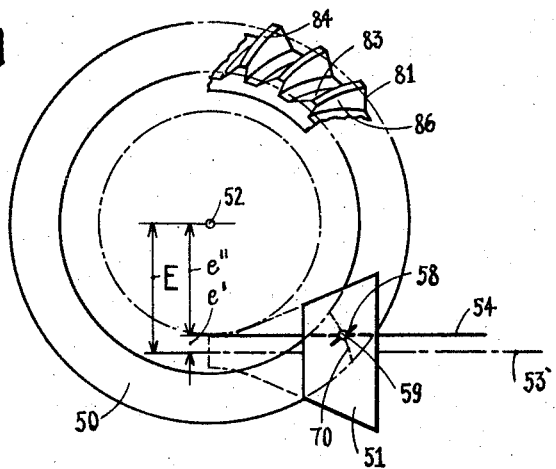
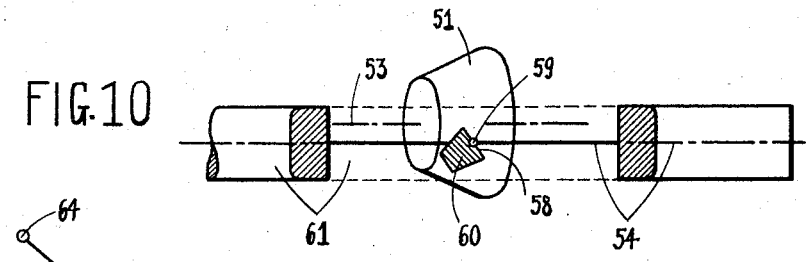
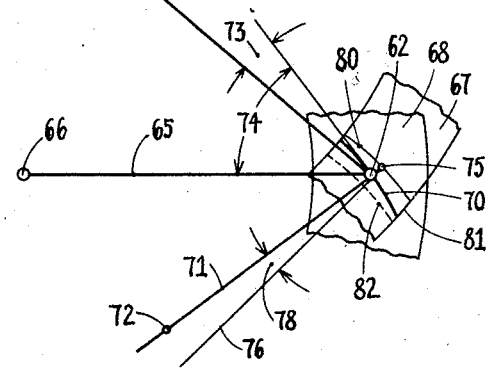
INVENTOR
Ernest Wildhaber Patented July 28, 1931 1,816,272

UNITED STATES PATENT OFFICE

ERNEST WILDHABER, OF BROOKLYN, NEW YORK

GEARING

Application filed June 18, 1928. Serial No. 286,285.

The present invention relates to the tooth shape of gears and may be applied to gears of any character.

One object of the present invention is to provide a novel tooth shape capable of carrying increased loads without undue wear. A further object is to devise novel tooth forms which permit comparatively simple and accurate computation and which insure smooth operation and high efficiency.

Further aims are to devise novel and useful tooth forms for gears having angularly disposed and offset axes, and moreover to provide tooth shapes suited to contact with each other along any given or assumed line. A novel tooth form shall further be devised for gears having angularly disposed and offset axes, comprising tooth surfaces composed of identical lines such as for instance tooth surfaces composed entirely of straight lines.

Another object is to devise a tooth form which can be conveniently covered and finished with a shaving edge.

A further object of the present invention is to provide a pair of gears having angularly disposed and offset axes, containing peculiar warped tooth surfaces of changing pressure angle, capable of carrying large loads.

In addition a novel analysis and mathematical treatment shall be disclosed, which is very useful in the computation of any tooth form of gears, and especially of hypoid gears and of worm gears.

Further objects will appear in the course of the specification and from recital of the appended claims.

Some embodiments of the present invention are illustrated in the accompanying drawings, in which Fig. 1 is a diagram illustrative of a known cycloidal form of tooth shown for comparison with one form of tooth shaped according to the present invention.

Fig. 8 is a plan view of auxiliary pitch surfaces of a pair of hypoid gears.

Fig. 9 is a front elevational view corresponding to Fig. 8, showing also some of the teeth of the gear, shaped in accordance with the present invention.

Fig. 10 is a view of a tool in engagement with a hypoid pinion diagrammatically indicated and corresponding to the pinion shown in Fig. 8 and Fig. 9.

Fig. 11 is a diagram further explanatory of the present invention, especially as applied to hypoid gears.

Figure 1:
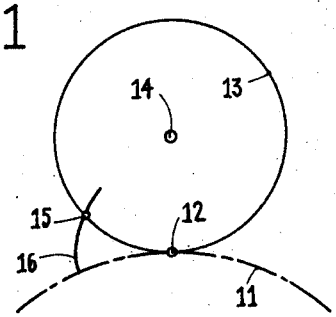
Figure 2:
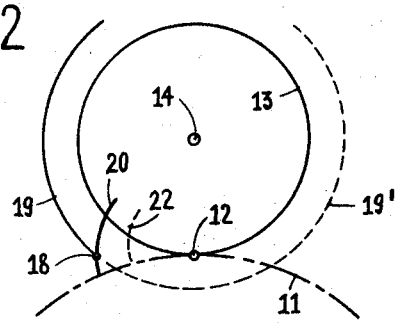
Fig. 2 is a diagram illustrative of said form of tooth, adapted to gears having parallel or intersecting axes.

In explaining the principles of the present invention, reference is first made to diagrams Fig. 1 and Fig. 2, in which the numeral 11 denotes the pitch circle of a gear, and where 12 is the pitch point or contact point with the pitch circle of a mating gear not further indicated. The pair of gears now considered may be supposed to be rotatable for instance on parallel axes. A rolling circle 13 having a center 14 is shown in contact with pitch circle 11 at said pitch point 12. Circle 13 is supposed to roll without sliding on pitch circle 11, as the latter turns on the axis of the gear, and thereby turns on its fixed center 14.

During such rolling motion a point 15 of rolling circle 13 (see Fig. 1) describes a cycloidal curve 16 relatively to the gear characterized by its pitch circle 11. This curve is suited to constitute a tooth profile of said gear, as is well known. The tooth profile of a mating gear may be similarly determined as the relative path of point 15 of rolling circle 13 with respect to said gear, when the said rolling circle rolls on the pitch circle of said mating gear. Tooth contact between said pair of gears takes place along the moving point 15, which in space describes an arc of rolling circle 13. The latter is therefore also the line of action between the pair of gears, as is well known.

I have found that in this determination of tooth curves it is unnecessary to be confined to points 15 of circle 13, and that with due modification the general principle is more broadly applicable.

According to one aspect of my invention, any point 18 (see Fig. 2) which is rigidly connected with rolling circle 13, can be considered as a point of action, which describes mating tooth curves as it turns on center 14 in connection with rolling circle 13.

Point 18 still fulfills the conditions of relative motion, as each element of its relative motion with respect to the gear containing pitch circle 11 as well as with respect to the mating gear can be considered as an infinitesimal turning motion about pitch point 12, like the relative motion between the gears themselves. Point 18 moves therefore in the same direction relatively to either gear as the gears move themselves relatively to each other. As will be understood by those familiar with kinematics, this is the requirement to be fulfilled to make point 18 continuously a point of tooth contact.

In its motion about center 14 point 18 describes a circle 19 which is the line of action between the gear containing pitch circle 11 and its mating gear. The tooth action takes place on a portion of said circle only, a portion 19' not intended for use being indicated in dotted lines. The tooth profile 20 described by point 18 is a curve of more general character than the cycloidal curve 16 referred to in Fig. 1.

Straight teeth having profiles as indicated in Fig. 2 may be formed or described on gears having parallel axes by a straight line parallel to the axis of a gear and passing through point 18, the said straight line being maintained in rigid connection with rolling circle 13. Helical teeth may be formed or described by a helix having an axis 14 and passing through point 18, when said helix is rigidly connected with rolling circle 13.

Teeth of the described character may be formed on bevel gears in an analogous manner.

A tooth profile 20, Fig. 2, contains certain advantages as compared with the cycloidal profile 16, Fig. 1. It possesses a more even curvature, that is to say the radii of curvature at different profile points do not change within such a wide range as they do on profile 16, Fig. 1. One drawback of the cycloidal profile 16 is the extreme curvature adjacent pitch circle 11, where the radius of curvature of said profile is known to assume the amount of zero. The said curvature makes gear profiles 16, Fig. 1, particularly sensitive to incidental displacements, such as for instance changes in the center distance of a pair of gears having parallel axes, and is known to reduce the load capacity of the gears. The said sensitiveness is much reduced by providing gear profiles 20, Fig. 2, which contain finite radii of curvatures in all the points above and on pitch circle 11.

A further step of the present invention consists in further widening its scope: Any line 22, Fig. 2, may be assumed as a line of contact between a pair of mating gears, of which 11 is the pitch circle of one, as will be further explained hereafter. The one condition imposed upon the position of line 22 is that its points should all have different positions along the instantaneous axis (12), to make line 22 a line of contact between a pair of gears having paralled axes. In other words line 22 should not extend in a plane perpendicular to the instantaneous axis, but intersect such perpendicular planes. An analogous restriction exists on bevel gearing, where line 22 should not extend in a spherical surface concentric with the apex of the pair of bevel gears.

Any point of an assumed line 22 may namely be considered as a point 18, which forms gear profiles such as profile 20 when maintained in rigid connection with rolling circle 13. Although the various points of line 22 may have different distances from the center 14 of rolling circle 13, each of them fulfills the kinematical requirements in forming a tooth profile (20). The totality of the various tooth profiles so formed constitute a tooth surface suited to transmit uniform motion. A tooth surface of this character can also be considered as the relative path of a given or assumed line 22 with respect to a gear body. Mating tooth surfaces are described by line 22 relatively to a pair of gears having pitch circles contacting at point 12, when said gears are rotated on their axes in a manner that their pitch circles roll upon each other without sliding, and when line 22 is rotated on center 14 in rigid connection with any rolling circle 13 which rolls without sliding on said pitch circles.

Rolling circle 13 can be considered as the pitch circle of a gear having an axis 14, and moving relatively to the gears of said pair in a manner corresponding to an instantaneous axis 12. An auxiliary gear of this character will be called a basic gear in the following, in analogy with the terms used in the gear art. Line 22 then may be considered as the active portion of a tooth side of said basic gear. In other words the present basic gear contains what might be called a line tooth, namely an active tooth surface reduced to a single line, whereas the conventional gears contain active tooth sides in the form of surfaces.

An infinite number of possible basic gears exist for any given pair of gears, inasmuch as the radius of rolling circle 13 or in other words of the pitch circle 13 of the basic gear may be varied at will. From the said infinite number a most suitable basic gear may be chosen.

A pair of gears with parallel axes contains basic gears, whose axes are all parallel to the axes of said pair and contained in the plane connecting said axes. A pair of gears having angularly disposed and intersecting axes, usually called bevel gears, also contains basic gears, whose axes are contained in the plane connecting the axes of said pair and moreover intersect the apex of said pair. In either case, whether the axes of a pair of gears are parallel or whether they intersect, any basic gear meshes with either gear of said pair in the same manner as the said gears mesh with each other. That is to say elementary relative motion between a basic gear and either gear of said pair has the same character as elementary relative motion between the pair of gears themselves. It is known to be an elementary turning motion about the instantaneous axis.

My discovery, as applied to gears having parallel axes or intersecting axes, may now be formulated broadly as follows:

Tooth contact between a pair of gears may be effected along any suitably assumed line when the mating tooth surfaces are formed as the relative paths of said line maintained in rigid connection with a basic gear or basic member.

Or in other words:

A line tooth of any basic gear or basic member describes mating tooth surfaces relatively to a pair of intermeshing gears.

This discovery assumes increased significance when applied to gears having angularly disposed and offset axes such as worm gears and hypoid gears, as will now be described.

In gearing having angularly disposed and offset axes no basic gear proper exists, which might mesh with one or both gears of a pair in the same manner as they mesh between themselves. Each element of relative motion between a pair of gears in this instance can be considered as a helicoidal motion about an instantaneous axis, that is to say a motion consisting of an angular turning motion about said axis and of a translation in the direction of said axis. There are gears which may mesh with either gear of a pair in a manner corresponding to the same instantaneous axis, but no gears exist which might mesh with one or both gears of said pair in a manner to also correspond to the same proportion between relative turning motion about the instantaneous axis and relative axial displacement in the direction of said axis, in other words to correspond to an instantaneous helicoidal relative motion of equal lead.

It is however known through prior inventions of mine, that helicoidal segments exist, which may mesh with either gear of a pair in a manner corresponding to an instantaneous relative motion of the nature of a helicoidal motion of the same lead and about the same instantaneous axis. Such segments differ from gears proper by performing a helicoidal motion instead of the circular motion of gears, that is to say by not only turning on their axes, but also moving in the direction of said axes.

Helicoidal segments of this character constitute basic members in gearing having angularly disposed and offset axes, and take the place of the basic gears above described.

The position of basic helicoidal segments relatively to a pair of gears, the ratio of their rotary motion as compared with the rotary motion of said gears, and the lead of their helicoidal motion may be determined with the known knowledge of the art, based on my prior inventions. For the convenience of those interested in the present invention, such determination will moreover be briefly described hereafter.

In principle any line, straight or curved, may be used as a line tooth of a basic helicoidal segment, in accordance with the present invention. Moreover the said line tooth may have any desirable position relatively to said basic segment or member. In contradistinction to spur gearing and bevel gearing, the said line may here also be assumed as a line extending directly from the root to the tip of the gear teeth, and the said line may describe the tooth surfaces of the gears while moving lengthwise of the teeth. These features will be found of importance, as described hereafter.

Figure 3:
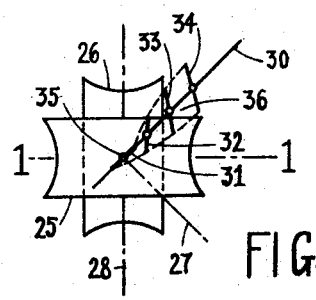
Fig. 3 is a diagrammatic plan view of a pair of worm gears suited to contact along a constant line describing a helicoidal surface of action, illustrative of an embodiment of the present invention.
Figure 4:
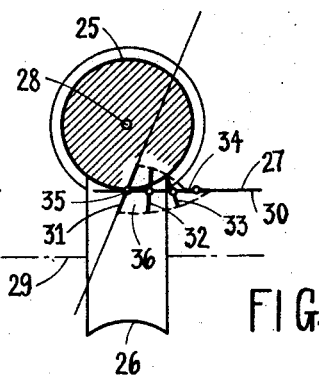
Fig. 4 is a front elevational view corresponding to Fig. 3 and partly a section along lines 1—1 of Fig. 3.

In Fig. 3 and Fig. 4 a pair of worm gears 25, 26 are indicated through their pitch surfaces, which are surfaces of revolution contacting along the instantaneous axis 27. In the instance illustrated the gears 25, 26 are supposed to turn on their axes 28, 29 at a ratio of one to one. Numeral 30 denotes the axis of one of the infinite number of helicoidal segments, which may be provided with a line tooth and then constitutes the basic member of the tooth shape. The said line tooth of the basic member, or in other words the line of contact between the gears 25, 26, may be assumed as a straight line 31, which in the present instance is seen to intersect the axis 30 of the basic member. As the gears 25, 26 turn on their axes and the basic member performs its helicoidal motion about its axis 30 in timed relation to the turning motion of the gears 25, 26, the line 31 assumes successive positions 32, 33, 34. The positions shown correspond to equal turning angles, and correspondingly the point 35 of intersection of line 31 with axis 30 moves by equal distance along axis 30.

The pair of gears provided with tooth surfaces as described, continuously contact along the moving line 31, that is to say along the various positions 31, 32, 33, 34 of said line.

The gears therefore contact along a constant line which moves angularly about axis 30 in timed relation to the rotation of the gears, and which is moreover displaced along said axis. The said line thereby describes in space a surface of action, which is seen to be a helicoidal surface 36.

While only one side of the teeth of worm gears 25, 26 has been so far considered, it is understood that the other side of the teeth may be formed in the same manner, as described.

In gearing with angularly disposed and offset axes it is frequently desirable to provide teeth suited to contact with each other along lines inclined by larger angles to their pitch lines, than is now usual and possible. An increased inclination of said lines is found to increase the intimacy of tooth contact, and to improve the mesh of the gears. So line of contact 31 is inclined by a right angle to the pitch lines of the teeth, which adjacent point 35 extend in the direction of instantaneous axis 27. In worm gearing as well as in hypoid gearing, the inclination of the average line of contact to the pitch lines or the lengthwise direction of the teeth is preferably made in excess of thirty degrees.

Figure 5:
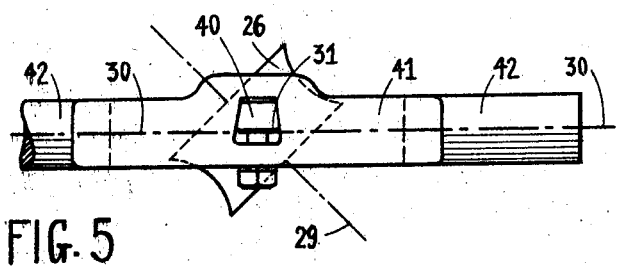
Fig. 5 and Fig. 6 are a plan view and a corresponding elevational view of a tool in engagement with a gear blank, the latter being shown diagrammatically.
Figure 6:
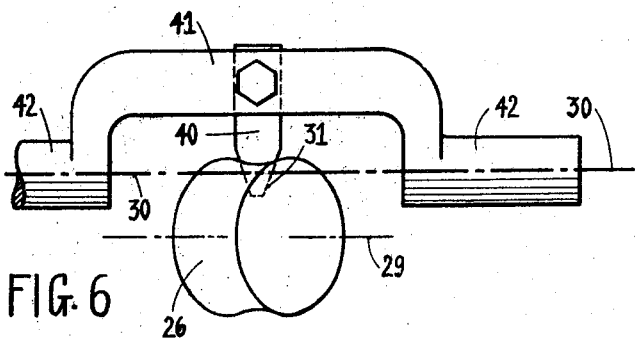

One way of finishing teeth of the described character will now be described with reference to the Figures 5 and 6.

The line tooth 31 (see Fig. 3 and Fig. 4) is here embodied as a cutting edge of a shaving tool 40, which is rigidly secured to a suitable tool holder 41. The latter contains shaft portions 42 coaxial with the axis 30 of the basic member, and may be moved in a helicoidal path about said axis. The lead of said helicoidal path equals the lead of the basic member described with reference to Fig. 3 and Fig. 4. Numerous means for effecting positive and accurate helicoidal motion are known in the art, and are therefore omitted in the drawings, beyond indication of the axis or shaft about which such helicoidal motion is performed.

The operation of finishing a tooth side of a gear blank 26 is as follows: Tool holder 41 is turned on its axis 30 and at the same time advanced in the direction of said axis, so that the cutting edge 31 of shaving tool 40 performs a helicoidal motion across the face of the gear blank 26. The latter is simultaneously turned on its axis 29 in timed relation to the helicoidal motion of tool 40. The interrelation between the various motions will be described hereafter. During such motions, the cutting edge 31 covers a whole active tooth side of the gear blank 26, and may be made to remove a thin layer of stock in a cut which may be called a shaving cut.

The gear blank may be indexed after every pass of tool 40, so as to present a new tooth side to the tool after every helicoidal stroke. Or, if so desired, it may be repeatedly reciprocated in its helicoidal path relatively to the rotating gear blank 26 and cut the same tooth side while being fed gradually to final relative position. After said tooth side is completely finished to proper size, the gear blank 26 is indexed and another tooth side is started on.

Instead of using a single cutting edge 31 and of operating on a single tooth side at a time, a tool (40) having two cutting edges 31, 43 or even more cutting edges may be provided. Two or more tooth sides may then be simultaneously finished.

Figure 7:
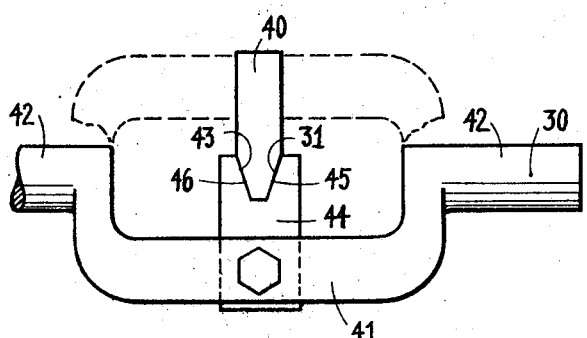
Fig. 7 is a view of a pair of complementary tools, as may be used for forming a pair of gears having angularly disposed and offset axes and containing tooth forms in accordance with the present invention.

One way of finishing two tooth sides on either gear of a pair of gears having angularly disposed and offset axes is outlined in Fig. 7. One gear blank is finished with a male tool 40 having two outwardly disposed cutting edges 31, 43. The other gear blank of the said pair may be finished with a female tool 44, having inwardly disposed cutting edges 45, 46. The two tools 40, 44 are complementary and are each movable in a helicoidal path about the axis 30 of the basic member.

The data of basic helicoidal segments will now be briefly described. Reference is made to Fig. 8 and Fig. 9 which relate specifically to hypoid gears and which can be considered as generally representing gears with angularly disposed and offset axes. In these figures the gears are indicated by their auxiliary pitch surfaces 50, 51 and are rotatable on axes 52, 53, which are offset from each other by a distance E, see Fig. 9. The two axes 52, 53 are angularly disposed to each other; namely at right angles in the illustrated instance. For convenience let N and n be the numbers of teeth of the gear (50) and the pinion (51) respectively. The axis 54 of a basic helicoidal segment is angularly disposed to the axes 52, 53 of either gear 50, 51 and is offset from said axes by amounts $e''$ and $e'$, see Fig. 9. Axis 54 is shown located on the auxiliary pitch surfaces 50, 51, which contact with each other along said axis. This shown location of the axis of a basic helicoidal segment or basic member is however not essential, and only represents one possible disposition adapted to the particular example illustrated. Let $p'$ and $p''$ be the angles included between the axes 53, 52 of the gears and the axis 54 of the considered basic member. It can be demonstrated, that the following interrelation exists between the angles $p'$ and $p''$ and the offsets $e'$ and $e''$:

(1) $e' = E \cdot \sin^2 p'$; $e'' = E \cdot \sin^2 p''$.

These formulas, as well as the subsequent formulas, refer to the case, where the angle $(p' + p'')$ included between the directions of the two gear axes 52, 53 is a right angle, as in the instance illustrated.

Angles $p'$ and $p''$ may be plotted to either side of the direction of the respective axes 53, 52, Fig. 8. In other words there exist two basic members for every given offset $e'$ or $e''$.

The angular motion of the helicoidal member can be computed in known manner as if said member were a gear, that is to say as if it would only perform a rotary motion on its axis. Let $a'$ (not shown) denote the angle included between the instantaneous axis and the direction of the pinion axis (53), that is to say the angle whose tangent equals the ratio of the numbers of teeth. When the axes 52, 53 of the gears are disposed at right angles, then $$\tan a' = \frac{n}{N}$$

The number of revolutions of the basic member on axis 54 can then be computed as:

(2) $n \dfrac{\cos a'}{\sin (p' - a')}$ or $n \dfrac{\cos a'}{\sin (p' + a')}$ when the gear and the pinion perform $n$ and $N$ revolutions respectively. The amount at the left corresponds to the location of axis 54 as indicated in Fig. 8, provided that the gears 50, 51 are suited to intermesh while turning in the directions of arrows 55, 56, or in directions opposite to both arrows. The amount at the right corresponds to a location of axis 54, as indicated in dotted lines 54' in Fig. 8, the angle $p'$ having been plotted on the opposite side of axis 53.

The lead $L_0$ of the basic member, or its axial advance per revolution may be computed as:

(3) $L_0 = 2\pi E \cdot \sin p' \cdot \cos p' = \pi \cdot E \cdot \sin (2p')$.

The hand of said lead is such as to correspond to a given instantaneous axis, and is found to be readily available.

A line of contact 58 between a pair of mating gears (50, 51) may again be assumed, adjacent a mean point 59, and embodied as a line tooth of a basic member. Mating tooth surfaces may be formed which contact along the various positions of said line 58 as the latter moves in a helicoidal path about axis 54. In Fig. 10 a shaving tool 60 is indicated, which contains a cutting edge 58 representing the above said line of contact or line tooth. Tool 60 is secured to a tool holder 61, shown partly in section, and which may be moved in a helicoidal path on its axis 54 identical with the axis of the basic member.

Another aspect of tooth forms constructed in accordance with the present invention will now be explained with reference to the diagram Fig. 11. The drawing plane of this Fig. 11 can be considered as a plane tangent at a mean point 62 to auxiliary pitch surfaces of a pair of hypoid gears. Fig. 11 therefore corresponds to the diagrams used in the established computation of hypoid gears. The axis of the gear or larger member of the pair is projected into a line 63, and intersects the said tangential plane in point 64. The latter is sometimes called the apex of the respective gear. The axis of the pinion or smaller member of the pair of hypoid gears is projected into a line 65 and intersects the said tangential plane at point 66. Portions of auxiliary pitch surfaces 67, 68 of gear and pinion respectively are indicated adjacent the point of contact 62. A pitch line of the gear is indicated at 70, and 71 denotes the projected normal to the tooth surfaces contacting at the mean point 62. The said projected normal 71 is also the normal to the pitch line 70 at point 62, and contains the center of curvature 72 of said pitch line. The angles 73, 74 are measures of the inclination of the teeth with respect to axial planes of the gears and are usually called the spiral angles of the gear and of the pinion. Preferably the spiral angle 74 of the pinion is made larger than the spiral angle 73 of the gear. The main body of the gear is supposed to be underneath the plane of the drawing, Fig. 11, and the main body of the pinion is supposed to be above said plane. With these explanations given the diagram, Fig. 11 is readily understood by those familiar with hypoid gearing.

A tooth form of the gears will now be further considered, which corresponds to a tooth contact extending along a line projected into line 71 and reaching from the root of the teeth directly to their tips, at right angles to the pitch line 70. To this end, the tooth normal at a point 75 of the desired line of contact is determined with known means of the art, from the requirement that a force acting in the direction of said tooth normal exerts turning moments on the two gears proportional to the respective numbers of teeth. Point 75 is supposed to be located close to point 62 and substantially on the tangential plane at point 62 of the contacting tooth surfaces. Considering first the concave sides of the gear teeth and a point 75 above the plane of the drawings, it is found that a tooth normal at point 75 would exert on the pinion a turning moment which is too small as compared with the turning moment exerted on the gear, when the tooth normal at point 75 is substantially parallel to the tooth normal at point 62. To effect turning moments of the ratio of the respective numbers of teeth, it is necessary to increase the turning moment exerted on the pinion. This may be done by providing a normal 76 at point 75 corresponding to a smaller spiral angle, that is to say a normal including an angle 78 with the normal 71 in the projection Fig. 11. A force acting in the direction of normal 76 exerts a substantially increased moment on the pinion, as compared with a force acting along a normal parallel to normal 71, whereas the moment exerted on the gear is only moderately increased, on account of the much smaller spiral angle of the gear. By providing a tooth normal 76 which is angularly displaced by an angle 78 with respect to normal 71 tooth contact may be effected at point 75 at the same time as at point 62, namely when angle 78 is so computed that a force acting along normal 76 exerts turning moments in proportion to the number of teeth of the respective gears.

A line 80 drawn through point 75 parallel to the pitch surface of the gear is perpendicular to projected normal 76, and therefore angularly disposed to pitch line 70. It is seen to approach pitch line 70 on the small end of the teeth and to further recede from said pitch line on the large end 81. This disposition results in pressure angles changing along the pitch line of the teeth. The pressure angles of the considered concave side of the gear teeth increase continuously from the small end of the teeth to their large end 81.

An analysis as described for the concave sides of the teeth of the gear may also be made for the convex sides of said teeth. A line 82 similar to line 80 may be drawn on a convex tooth side parallel to the pitch surface of the gear and above the plane of the drawings. It is shown dotted, and is seen to approach pitch line 70 on the large end 81 of the teeth, while is recedes from said pitch line on the small end of the teeth. On the convex side of the gear teeth and on the mating concave side of the pinion teeth, the pressure angles therefore decrease continuously along the pitch line towards the large end of the teeth. This feature can be more broadly expressed, regardless of whether or not the teeth are curved lengthwise, through the statement, that on the tooth sides of the pinion which are inclined towards its small end, the pressure angles decrease towards the large end of the teeth.

It is noted that the pressure angles change oppositely on the two sides of the teeth, and that they decrease on one side and increase on the other side towards the same end of the teeth, such as the large end of the teeth.

The characteristic of changing pressure angles is seen contained also on the teeth of the gear illustrated in Fig. 9. The convex side 83 of the teeth (84), that is to say the outwardly facing tooth surface, shows up much wider on the smaller end of the teeth than on the large end 81, in the projection Fig. 9, and thereby indicates pressure angles decreasing towards the large end of the teeth. The same holds true for the tooth sides of the pinion which mesh with the convex tooth sides of the gear.

The concave tooth sides 86 of the gear are projected in a manner to show up much narrower at their small end than at their large end 81, and through the pronounced difference indicate pressure angles increasing towards the large end of the teeth.

While in the drawings the lines of contact (31, 58) between mating gears are shown to extend directly from the root to the tip of the teeth, substantially at right angles to the pitch lines, it is understood that the said lines may also be disposed at acute angles to the pitch lines of the teeth, especially in the case of hypoid gears of comparatively large width of face. In hypoid gearing the rate of change of the pressure angles is found to be more pronounced than in worm gearing. A disposition of said lines at acute angles to the pitch lines is suited to reduce the rate of change of the pressure angles, so that the pressure angles at the small end and at the large end of the teeth may be kept within convenient limits also on gears with comparatively large width of face.

Many changes and modifications may be made in my invention without departing from its spirit, by simply employing the knowledge of the art. For definition of its scope it is relied upon the appended claims.

What I claim is:

1. A pair of gears suited to contact along a constant line movable about an axis, said line being differently positioned relatively to said axis as compared with the contact line between the pitch surfaces of said pair of gears, and the surface described by said line in its motion about said axis differing from a plane.

2. A pair of gears suited to contact along a constant line movable about an axis in exact proportion to the rotation of said gears, said line being differently positioned relatively to said axis as compared with the contact line between the pitch surfaces of said pair of gears, and the surface described by said line in its motion about said axis differing from a plane.

3. A pair of gears suited to contact along a constant line movable about an axis in exact proportion to the rotation of said gears, said line being angularly disposed to the direction of said axis, and the surface described by said line in its motion about said axis differing from a plane.

4. A pair of gears suited to contact along a constant line movable about an axis in proportion to the rotation of said gears, said line being angularly disposed to the direction of said axis and including an angle in excess of thirty degrees (30°) with the pitch lines of the teeth adjacent the center of the gear face.

5. A pair of gears having angularly disposed and offset axes, suited to contact along a straight line movable about an axis and maintained in a constant relation with respect to said axis, said line having a different position with respect to said axis as compared with the position of the instantaneous axis of said gear pair with respect to said same axis.

6. A pair of gears having angularly disposed and offset axes, suited to contact along a constant line movable in a helicoidal path, said line having a different position with respect to the axis of said path as compared with the position of the instantaneous axis of said gear pair with respect to the axis of said path.

7. A pair of gears having angularly disposed and offset axes, suited to contact along a straight line maintained in rigid connection with a basic helicoidal segment, said line having a different position with respect to the axis of said segment as compared with the position of the instantaneous axis of said gear pair with respect to the axis of said segment.

8. A pair of tapered gears having angularly disposed and offset axes, the two sides of the teeth of said gears having oppositely changing pressure angles, the pressure angles of one side of the teeth increasing and the pressure angles of the other side decreasing towards the same end of the teeth.

9. A pair of tapered gears having angularly disposed and offset axes and containing teeth curved lengthwise, the two sides of the teeth of said gears having oppositely changing pressure angles, the pressure angles of one side of the teeth increasing and the pressure angles of the other side decreasing towards the same end of the teeth.

10. A pair of tapered gears having angularly disposed axes, the two sides of the teeth of said gears having oppositely changing pressure angles, the pressure angles of one side increasing and the pressure angles of the other side decreasing towards the same end of the teeth.

11. A pair of tapered gears having angularly disposed axes, the two sides of the teeth curved lengthwise, the two sides of the teeth of said gears having oppositely changing pressure angles, the pressure angles of one side of the teeth increasing along the pitch lines and the pressure angles of the other side decreasing along the pitch lines towards the same end of the teeth.

12. A pair of tapered gears having angularly disposed axes, the two sides of the teeth of said gears having pressure angles changing oppositely by equal amounts, the pressure angles of one side increasing and the pressure angles of the other side decreasing by equal amounts towards the same end of the teeth.

13. A pair of tapered gears having angularly disposed and offset axes, the pinion of said pair having teeth of larger spiral angle than the gear or larger member of said pair, the pressure angles changing along the pitch lines of the teeth in a manner that on the outwardly facing tooth surfaces of the gear the pressure angles decrease towards the large end of the teeth.

14. A pair of tapered gears having angularly disposed and offset axes and containing teeth curved lengthwise, the pinion of said pair having teeth of larger spiral angle than the gear or larger member of said pair, the pressure angles changing along the pitch lines of the teeth in a manner that on the outwardly facing tooth surfaces of the gear the pressure angles decrease towards the large end of the teeth.

15. A pair of tapered gears having angularly disposed and offset axes and containing tooth sides of changing pressure angle, the pressure angles along the pitch lines decreasing towards the large end of the teeth on the tooth sides of the pinion inclined towards its small end and on the mating tooth sides of the gear.

16. A pair of tapered gears having angularly disposed and offset axes and containing teeth curved lengthwise, the pressure angles along the pitch lines of said gears decreasing towards the large end of the teeth on the tooth sides of the pinion inclined towards its small end and on the mating tooth sides of the gear.

17. A pair of gears having angularly disposed and offset axes, the smaller member of said pair containing tooth surfaces having profiles in axial sections changing lengthwise of its axis and having a constant pitch along an arc tangent to the pitch surface of the teeth, said arc being inclined to planes containing the axis of said member.

18. A pair of gears having angularly disposed and offset axes, the smaller member of said pair containing tooth surfaces having profiles in axial sections changing lengthwise of its axis, both gears having a constant pitch along an arc tangent to their pitch surfaces and being suited to successively contact along said arc, said arc being inclined to a plane perpendicular to the axis of the larger member and which contains the axis of said smaller member.

19. A gear provided with teeth inclined to the direction of its axis at an angle of at least forty-five degrees (45°), having a constant pitch and constant tooth profiles along an arc tangent to its pitch surface, said arc being inclined to planes containing the axis of said gear, the constant tooth profiles being inclined at a constant angle with respect to said arc.

20. A pair of tapered gears having angularly disposed and offset axes, the general inclination of a tooth surface of a gear with respect to the pitch surface of said gear differing at least ten degrees (10°) on the large end and on the small end of the teeth.

21. A pair of tapered gears having angularly disposed and offset axes, containing teeth angularly disposed with respect to the straight generatrices of the respective pitch surfaces, the general inclination of a tooth surface of a gear with respect to the pitch surface of said gear differing at least ten degrees (10°) on the large end and on the small end of the teeth, said inclination decreasing towards the large end of the teeth on the pinion tooth sides which face towards its small end, and on the mating tooth sides of the gear.

22. A pair of tapered gears having angularly disposed and offset axes, containing teeth curved lengthwise, the general inclination of a tooth surface of a gear with respect to the pitch surface of said gear differing at least ten degrees (10°) on the large end and on the small end of the teeth, said inclination decreasing towards the large end of the teeth on the pinion tooth sides of concave lengthwise curvature, and said inclination increasing towards the large end of the teeth on the pinion tooth sides of convex lengthwise curvature, and on the mating tooth sides of the gear.

ERNEST WILDHABER.